United States Patent
Kawabata et al.

(10) Patent No.: US 7,280,128 B2
(45) Date of Patent: Oct. 9, 2007

(54) APPARATUS FOR AND METHOD OF RECORDING IMAGE

(75) Inventors: Motonobu Kawabata, Kyoto (JP); Masamichi Cho, Kyoto (JP); Katsuki Fukuyama, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 136 days.

(21) Appl. No.: 11/121,141

(22) Filed: May 4, 2005

(65) Prior Publication Data

US 2005/0254843 A1    Nov. 17, 2005

(30) Foreign Application Priority Data

| May 14, 2004 | (JP) | ............................. 2004-144876 |
| Jun. 22, 2004 | (JP) | ............................. 2004-183528 |
| Mar. 3, 2005 | (JP) | ............................. 2005-059270 |
| Apr. 7, 2005 | (JP) | ............................. 2005-111147 |

(51) Int. Cl.
*B41J 2/47* (2006.01)
*G03G 15/04* (2006.01)

(52) U.S. Cl. ..................... 347/233; 347/247; 347/238; 347/250; 347/224; 347/225; 399/32

(58) Field of Classification Search ............... 399/32; 347/115, 232, 233, 237, 238, 247, 250, 224, 347/225; 101/174
See application file for complete search history.

(56) References Cited

U.S. PATENT DOCUMENTS

| 5,182,990 A | 2/1993 | Kline et al. |
| 5,648,809 A | 7/1997 | Kato et al. |
| 6,160,610 A | 12/2000 | Toda |
| 6,567,713 B2 * | 5/2003 | Lichtenstein et al. ......... 700/58 |
| 2004/0056945 A1 | 3/2004 | Takamatsu et al. |

FOREIGN PATENT DOCUMENTS

JP    11-38637    12/1999

* cited by examiner

*Primary Examiner*—Daniel J. Colilla
*Assistant Examiner*—Marissa Ferguson-Samreth
(74) *Attorney, Agent, or Firm*—McDermott Will & Emery LLP

(57) ABSTRACT

An image recording apparatus includes a scanning part for recording a plurality of unit images individually on a plurality of recording media, the plurality of unit images being to be superimposed on each other to form a single objective image. The scanning part causes the plurality of unit images to be in different positions. Defects appear in different positions of the plurality of unit images, and are prevented from coinciding with each other in the objective image.

18 Claims, 16 Drawing Sheets

F I G . 3
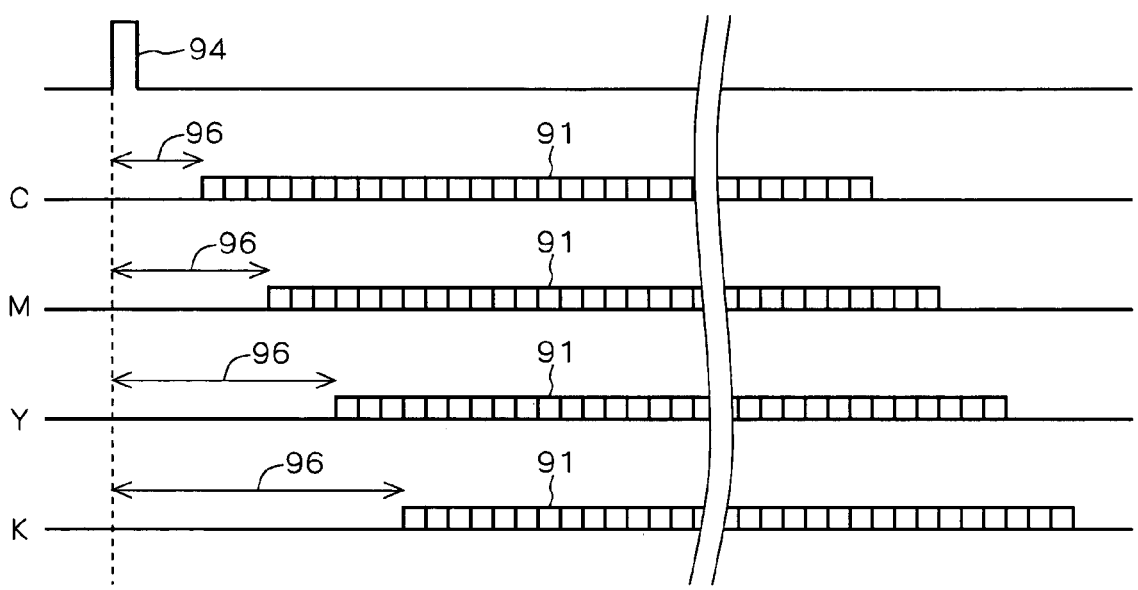

F I G. 8 A
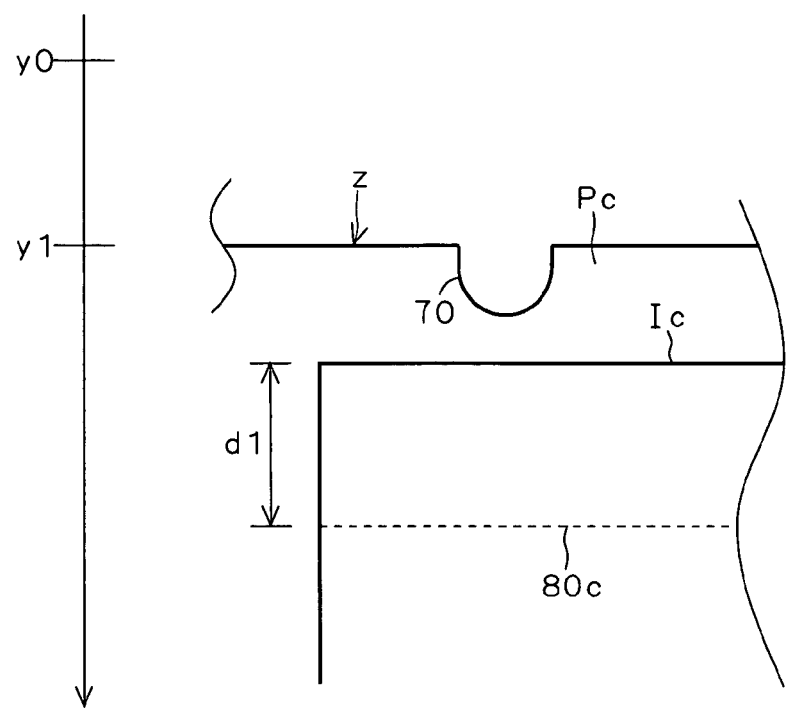
F I G. 8 B
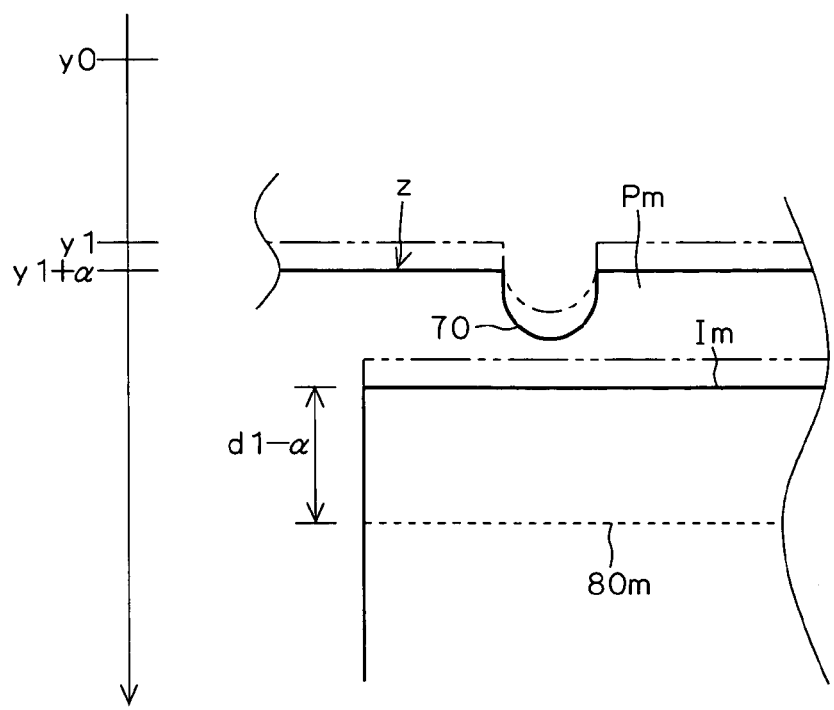

APPARATUS FOR AND METHOD OF RECORDING IMAGE

BACKGROUND OF THE INVENTION

1. Field of the Invention

The present invention relates to an apparatus for and a method of recording an image on a recording medium.

2. Description of the Background Art

In the step of printing, a plurality of unit images are superimposed on each other to form a single objective image in some cases. Examples of the plurality of unit images include single-color images for cyan, magenta, yellow and black. An image recording apparatus for forming printing plates corresponding to the respective unit images is used in such a printing step.

The image recording apparatus employs a deflector such as a polygon mirror to move an optical beam such as a laser beam in a main scanning direction, and moves a printing plate in a sub-scanning direction. In this manner, the image recording apparatus forms a two-dimensional image on the printing plate. This two-dimensional image is a unit image. The image recording apparatus produces a plurality of such unit images. Then, a known printing machine overprints these unit images on a sheet of paper to form a color image. This color image is an objective image.

FIG. 15 shows a construction of a conventional image recording apparatus 500. An optical beam emitted from a light source 510 is deflected in the main scanning direction by a deflector 520. The deflected optical beam passes through an image-forming optical system 530, and is imaged on a recording surface of a printing plate 540. Thus, an image is recorded.

However, if there is a defective spot 531 such as flaws, striae and the like in part of an optical member constituting the image-forming optical system 530, the intensity of the optical beam is attenuated when the optical beam passes through the defective spot 531. This causes a partial decrease in the density of each main scanning line 560 on the printing plate 540, resulting in the appearance of a lightly colored streak 570 in the recorded image.

After the production of a plurality of printing plates in such an image recording apparatus 500, the images recorded on the respective printing plates include streaks 570 in the same position. For example, when printing plates for yellow, magenta, cyan and black are produced, the images recorded on the respective printing plates include streaks y, m, c and k in the same position, as shown in FIG. 16. When these images are overprinted on a single sheet S, the streaks y, m, c and k are superimposed on each other, thereby to be intensified. This results in the appearance of a conspicuous streak X in the color image formed on the sheet S.

SUMMARY OF THE INVENTION

The present invention is intended for an image recording apparatus.

According to the present invention, the image recording apparatus comprises: a scanning part for recording a plurality of unit images individually on a plurality of recording media, the plurality of unit images being to be superimposed on each other to form a single objective image; and a holding part for holding the plurality of recording media, wherein the scanning part causes at least one of the plurality of unit images to be in a different position relative to a reference position of the holding part.

A defect appearing in at least one of the plurality of unit images is in a different position. This reduces the superimposition of defects in the objective image.

Preferably, the scanning part causes all of the plurality of unit images to be in different positions from each other relative to the reference position.

Defects appearing in the plurality of unit images are in different positions from each other. This avoids the superimposition of the defects in the objective image.

Preferably, the image recording apparatus further comprises an index forming part for providing an index serving as a reference for superimposition of the plurality of unit images to the plurality of recording media, wherein the index forming part causes the plurality of recording media to differ from each other in position of the index in corresponding relation to the positions of the plurality of unit images.

All of the unit images have the same positional relationship between the unit image and the index. This achieves precise overprinting of the plurality of unit images.

Preferably, the holding part is a table for placing the plurality of recording media thereon, and the image recording apparatus further comprises a positioning part for positioning the plurality of recording media on the table, wherein the positioning part causes the plurality of recording media to be in different positions in corresponding relation to the positions of the plurality of unit images.

The positions of the unit images relative to the recording media are fixed for the recording media. This achieves precise overprinting of the plurality of unit images.

According to another aspect of the present invention, the image recording apparatus comprises: a dividing part for dividing each of the plurality of unit images into a first image and a second image; a first scanning part for recording the first image; and a second scanning part for recording the second image, wherein the dividing part causes at least one of the plurality of unit images to differ in dividing position.

Because of the division into the first image and the second image for recording, the image recording apparatus can record a wholly large-sized unit image. Additionally, a defect appearing between the first image and the second image for at least one of the unit images is in a different position. This reduces the superimposition of defects in the objective image.

Preferably, the dividing part causes all of the plurality of unit images to differ from each other in dividing position.

Defects appearing between the first image and the second image for all of the unit images are in different positions from each other. This avoids the superimposition of the defects in the objective image.

Preferably, the first scanning part and the second scanning part cause the plurality of recording media to differ from each other in positions of the plurality of unit images on the plurality of recording media.

This also avoids the superimposition of defects based on the optical system.

The present invention is also intended for a method of recording an image.

It is therefore an object of the present invention to provide a technique capable of reducing the superimposition of defects in an objective image obtained by superimposing a plurality of unit images on each other if a defect appears in each of the plurality of unit images.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a timing chart for image signals;

FIGS. 8A and 8B show edge portions of printing plates after recording;

DESCRIPTION OF THE PREFERRED EMBODIMENTS

Preferred embodiments according to the present invention will now be described with reference to the drawings.

1. First Preferred Embodiment

1-1. Construction of Apparatus of First Preferred Embodiment

Figure 1:
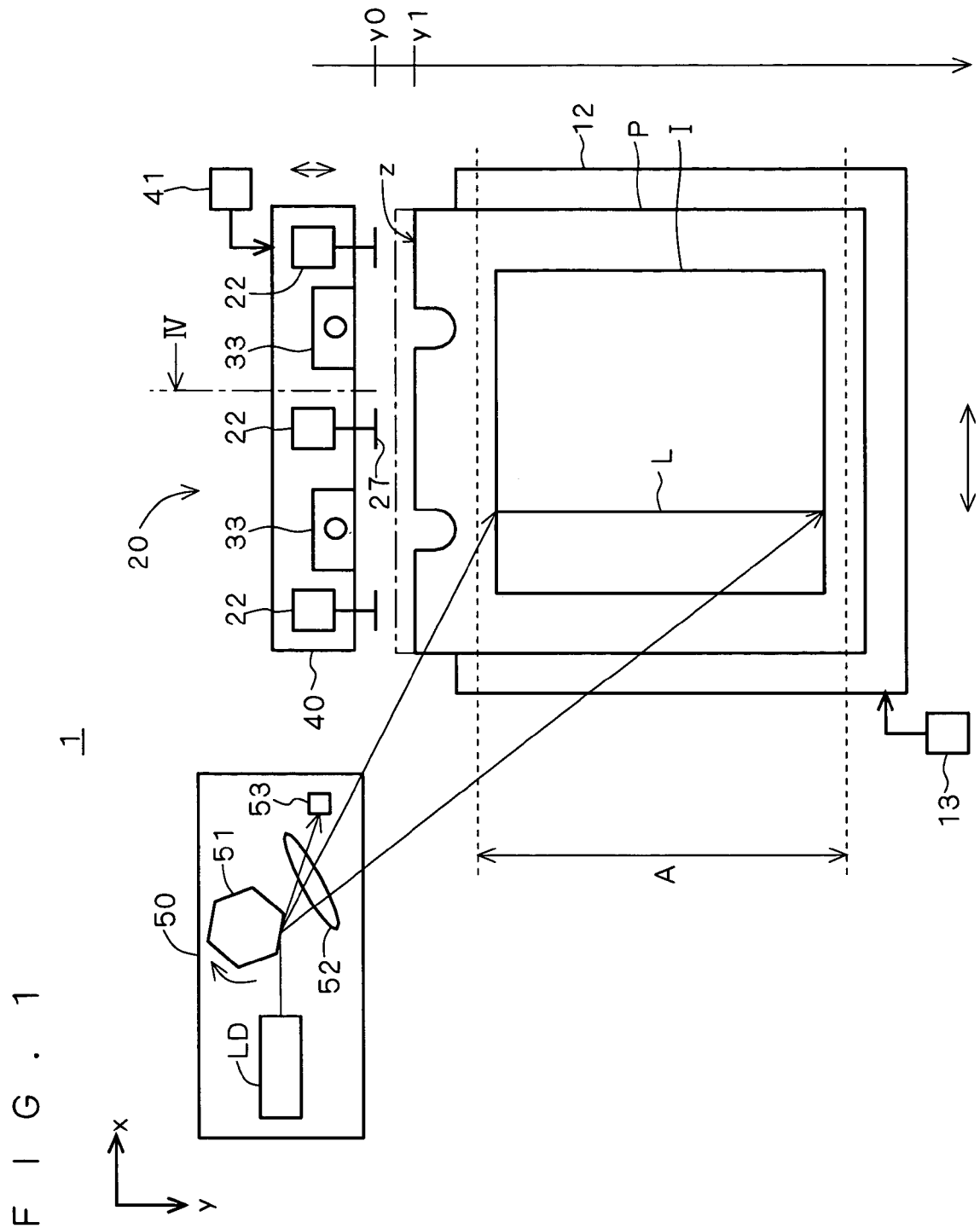
FIG. 1 shows a construction of an image recording apparatus according to a first preferred embodiment of the present invention.

FIG. 1 shows an image recording apparatus 1 according to a first preferred embodiment of the present invention.

A printing plate P is a photosensitive recording medium for printing. The image recording apparatus 1 selectively exposes portions of the printing plate P to light while scanning the printing plate P. Thus, the image recording apparatus 1 records a halftone-dot image having a desired size on the printing plate P.

The image recording apparatus 1 principally comprises a table 12, a positioning and punching unit 20, a driver 41, a main scanning unit 50, and a driver 13. The table 12 is a holding part for placing the printing plate P to be exposed thereon. The positioning and punching unit 20 includes positioning units 22 and punching units 33. The driver 41 moves the positioning and punching unit 20 in a main scanning direction (y). The main scanning unit 50 directs an optical beam onto the printing plate P to scan the optical beam in the main scanning direction. The driver 13 moves the table 12 in a sub-scanning direction (x). The main scanning direction and the sub-scanning direction are orthogonal to each other.

The main scanning unit 50 includes a laser diode LD, a polygon mirror 51, and an optical system 52. The laser diode LD emits an optical beam in accordance with an image signal. The polygon mirror 51 is a deflector for deflecting the optical beam emitted from the laser diode LD. The optical system 52 images the deflected optical beam on the printing plate P.

The polygon mirror 51 has the shape of a polygonal prism rotatable about its axis. Side surfaces of the polygon mirror 51 act as reflecting surfaces. The polygon mirror 51 rotates while reflecting the optical beam from the reflecting surfaces thereof, thereby to deflect the optical beam.

The optical system 52 includes a combination of an fθ lens, a cylindrical lens, and the like. The fθ lens converts the motion with constant angular velocity of the optical beam to be deflected into a motion with constant velocity. The cylindrical lens corrects variations in a direction normal to each of the reflecting surfaces of the polygon mirror 51. A collimator lens, a cylindrical lens and the like may be disposed between the laser diode LD and the polygon mirror 51.

The optical beam emitted from the laser diode LD is reflected from the reflecting surfaces of the polygon mirror 51, passes through the optical system 52, and is then imaged on the printing plate P. The image-forming position moves in the main scanning direction as the polygon mirror 51 rotates. Thus, a single scanning line L is recorded. The area which the main scanning unit 50 can scan with the optical beam is an image area A. The length of the scanning line L is determined by the size of an image to be recorded, but is not beyond the image area A. In other words, the image area A is an area in which an image can be recorded effectively.

The main scanning unit 50 includes a start sensor 53 for detecting the origin of the image area A. The start sensor 53 is an optical sensor. Upon detecting the optical beam, the start sensor 53 transmits a start pulse. The optical beam deflected by the polygon mirror 51 also enters the start sensor 53. The drive control of the laser diode LD is effected on the basis of the start pulse transmitted from the start sensor 53 in response to the entrance of the optical beam.

Figure 2:
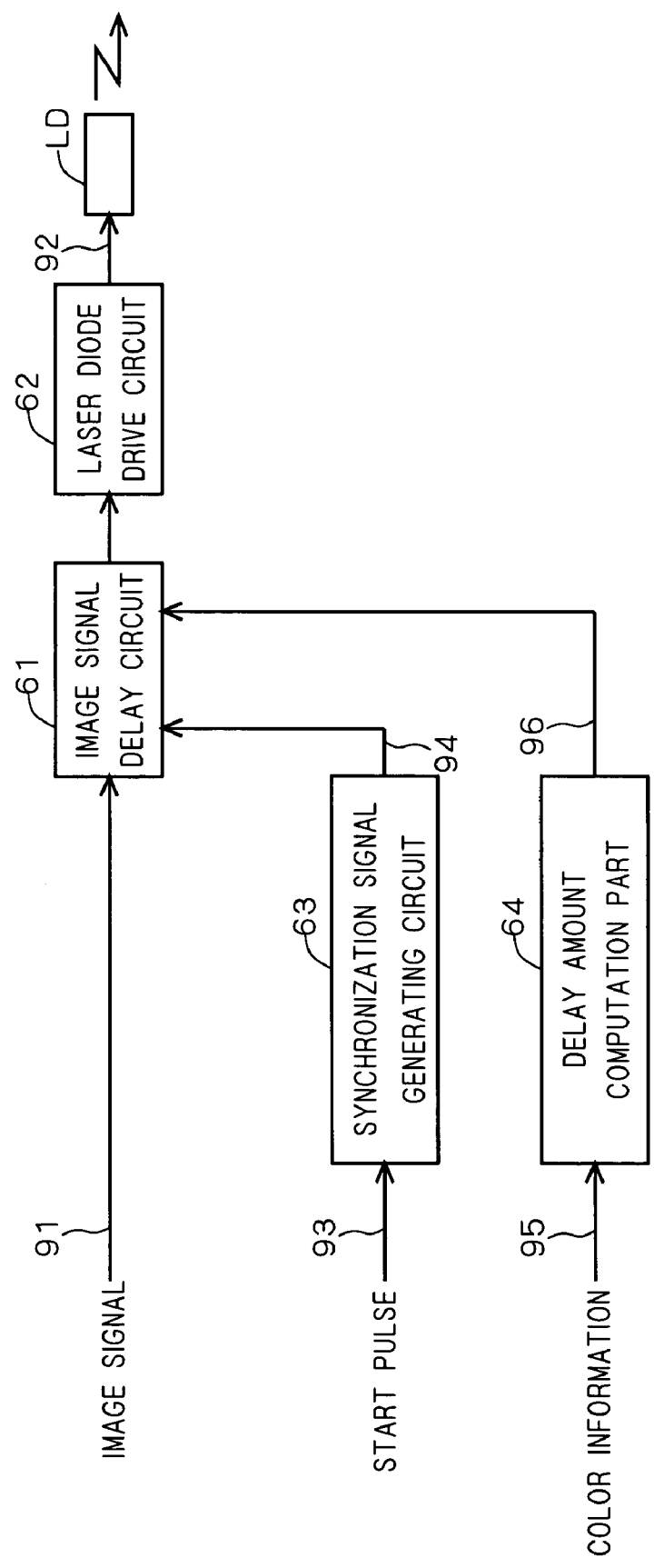
FIG. 2 shows a construction of a drive control system for a laser diode.

FIG. 2 shows a construction of a drive control system for the laser diode LD. An image signal 91 given to the main scanning unit 50 is delayed by a predetermined amount of time in an image signal delay circuit 61, and is then passed to a laser diode drive circuit 62. The image signal 91 is converted into a drive signal 92 in the laser diode drive circuit 62. The laser diode LD is controlled to be ON/OFF by the drive signal 92.

A synchronization signal generating circuit 63 generates a timing signal 94 based on a start pulse 93 received from the start sensor 53 to provide the timing signal 94 to the image signal delay circuit 61. The image signal delay circuit 61 acquires the timing signal 94 and a delay amount 96. The image signal delay circuit 61 delays the image signal 91 by the delay amount 96 after the receipt of the timing signal 94, and then provides the image signal 91 to the laser diode drive circuit 62.

A delay amount computation part 64 calculates the delay amount 96 based on color information 95 about an image to be recorded. This enables the image signals 91 for the respective colors constituting a color image to be delayed by different delay amounts 96, as shown in FIG. 3. Thus, there is a difference in the time at which the laser diode LD is driven between the colors, and there is a difference in the position of the scanning line L between the colors.

The image signal delay circuit 61, for example, temporarily stores the image signal 91 in a memory, and controls the read timing thereof in accordance with the delay amount 96. Alternatively, the image signal delay circuit 61 may temporarily store the image signal 91 in a shift register to shift the image signal 91 by the amount of shift depending on the delay amount 96.

Referring again to FIG. 1, the construction of the positioning and punching unit 20 will be described. The positioning and punching unit 20 positions the printing plate P in the main scanning direction, and punches holes in a reference edge surface z of the printing plate P. The positioning and punching unit 20 includes a mounting base 40 provided with the two punching units 33 and the three positioning units 22. The positioning and punching unit 20 is moved by the driver 41 in a forward direction (in the y direction) toward the table 12 and in a backward direction (in the −y direction) away from the table 12.

The positioning units 22 move the printing plate P along the upper surface of the table 12. This achieves the positioning of the printing plate P in the main scanning direction. The punching units 33 form punched holes in one edge of the positioned printing plate P.

The printing plate P is initially placed on the table 12, with the reference edge surface z of the printing plate P protruding sufficiently from one edge of the table 12 (as indicated by dash-and-dot lines in FIG. 1). The positioning units 22 bring positioning plates 27 into contact with the reference edge surface z of the printing plate P, and move in the y direction. The printing plate P is forced in the main scanning direction and positioned by the positioning plates 27.

The positioning and punching unit 20 is driven by a feed motor to move in the y direction. Thus, the distance that the positioning and punching unit 20 moves from a home position y0, that is, the distance that the printing plate P is forced can be changed to any value by controlling the feed motor. For this reason, the position of the printing plate P in the main scanning direction can be determined at any position. A position of the reference edge surface z at the time that the printing plate P is normally positioned is referred to hereinafter as a reference position y1.

The positioning plates 27 of the positioning units 22 are switchable between a contactable position in which the positioning plates 27 can contact the reference edge surface z of the printing plate P and a non-contactable position in which the positioning plates 27 cannot contact the reference edge surface z.

Figure 4:
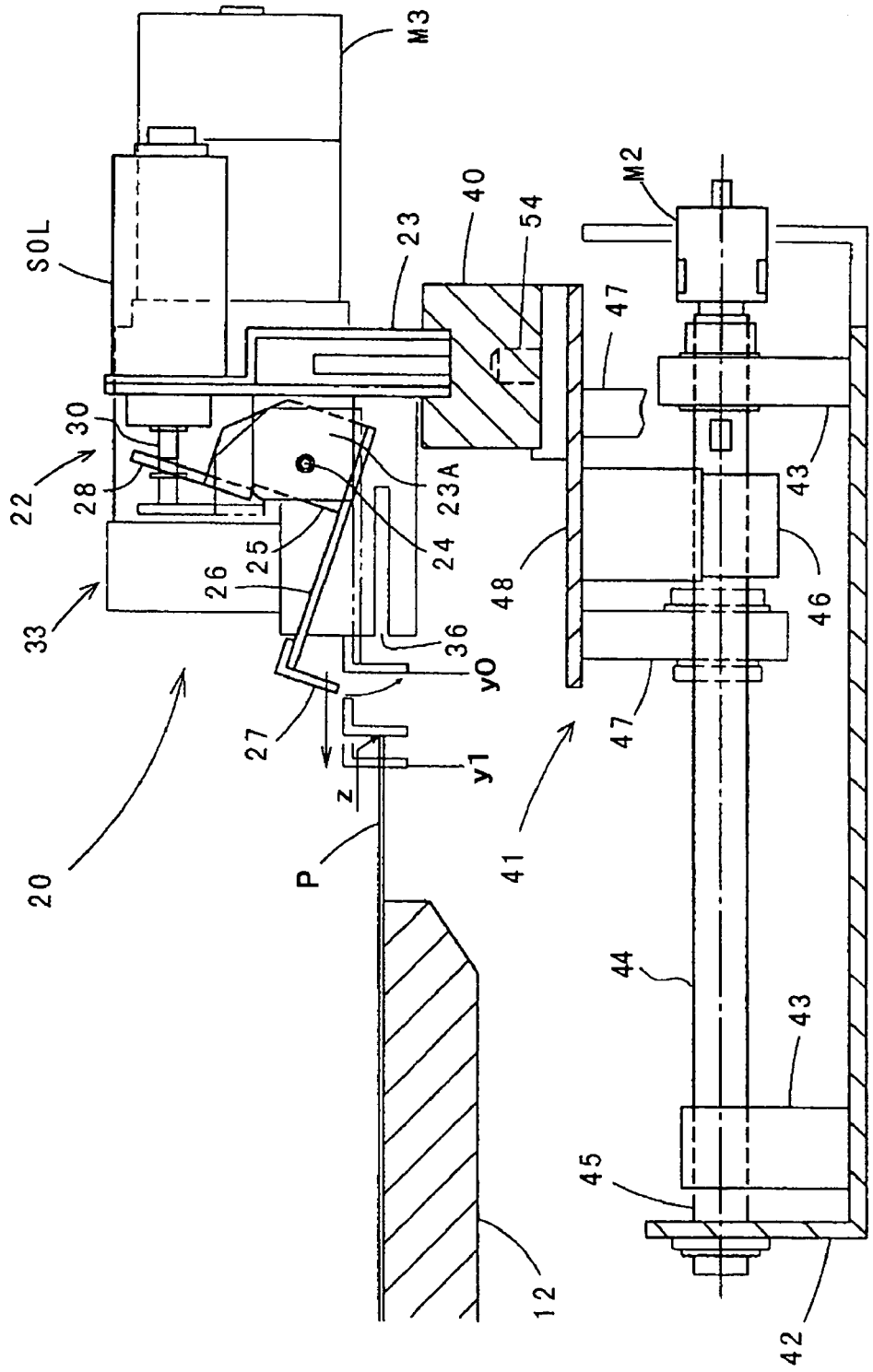
FIG. 4 is a sectional view of a positioning and punching unit.

FIG. 4 is a sectional view taken along the line IV of FIG. 1. The construction of the positioning and punching unit 20 will be further described with reference to FIG. 4. The positioning unit 22 is supported by a support member 23 fitted and fixed in a recessed groove of the mounting base 40. The support member 23 has a horizontally protruding shaft support member 23A. A pivot shaft 24 is horizontally supported by the shaft support member 23A. A rocking member 25 is pivotally mounted on the pivot shaft 24. The rocking member 25 includes a first arm 26 having a distal end to which the positioning plate 27 is attached. The rocking member 25 further includes a second arm 28 extending in a direction perpendicular to the first arm 26. The second arm 28 is urged backwardly by a spring into contact with a tip of an extendable/retractable shaft 30 of a solenoid member SOL mounted to the support member 23.

When the solenoid member SOL operates, the shaft 30 is extended against the urging force of the spring to press the second arm 28. This causes the rocking member 25 to pivot about the pivot shaft 24, thereby lowering the positioning plate 27 into a suspended position. Such a suspended position is the contactable position in which the positioning plate 27 can contact the reference edge surface z of the printing plate P.

On the other hand, when the solenoid member SOL stops, the second arm 28 is pulled backwardly by the spring. This brings the positioning plate 27 into a raised position. Such a raised position is the non-contactable position in which the positioning plate 27 does not interfere with the printing plate P.

As described above, the action of the solenoid member SOL allow the switching of the positioning plate 27 between the suspended position (the contactable position) and the raised position (the non-contactable position).

The punching unit 33 is formed with an insertion opening 36. The insertion opening 36 is at a height which allows the reference edge surface z of the printing plate P on the table 12 to enter the insertion opening 36. The insertion opening 36 is provided with a punch and a die which are vertically opposed to each other. The punching unit 33 further includes a cam mechanism for converting the rotary motion of a motor M3 into a vertical motion of the punch. One rotation of the motor M3 moves the punch downwardly toward the die and then upwardly. This provides a punched hole formed in the printing plate P inserted in the insertion opening 36.

Figure 5A:
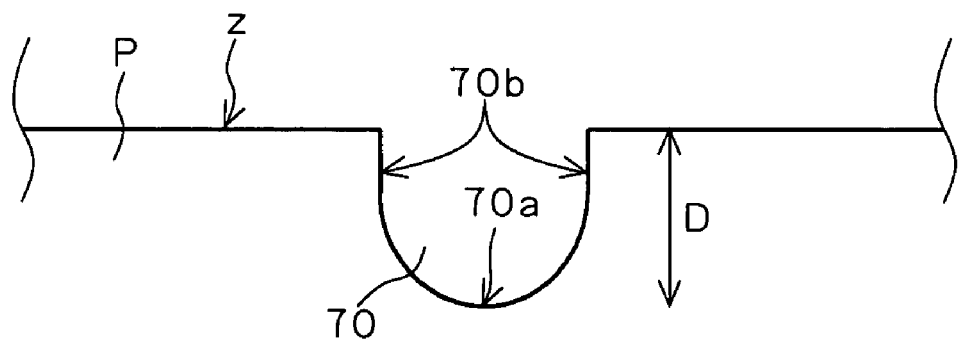
FIGS. 5A and 5B show the shapes of punched holes.

FIG. 5A shows the shape of a punched hole 70 formed in the printing plate P by the punching unit 33. The punched hole 70 is such that a portion of the printing plate P is cut away from the reference edge surface z side. In the step of overprinting, the punched hole 70 and a pin formed on a plate cylinder are fitted together, whereby the printing plate P is positioned. That is, the punched hole 70 is an index serving as a reference for overprinting of a plurality of unit images. The punching unit 33 is an index forming part for forming the index.

The punching unit 33 is capable of forming the punched hole 70 even if the amount of insertion of the printing plate P into the insertion opening 36 is varied. Varying the amount of insertion of the printing plate P changes a relative positional relationship between the punching unit 33 and the printing plate P, thereby changing the depth D of the punched hole 70, that is, a distance from the reference edge surface z to the top of the punched hole 70.

Figure 5B:
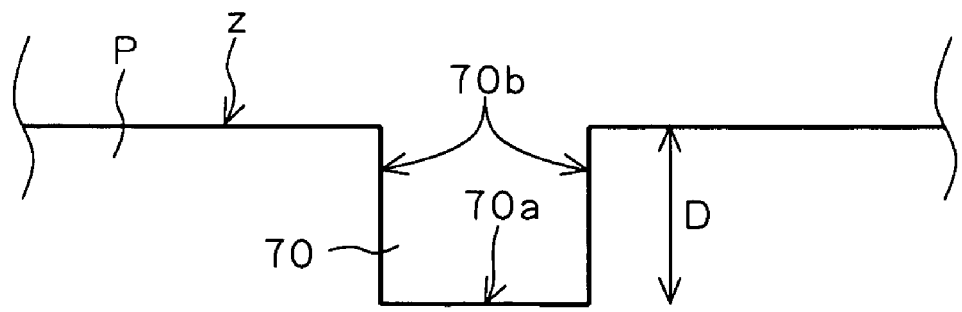

The punched hole 70 is U-shaped, as shown in FIG. 5A. That is, the punched hole 70 has an arcuate tip portion 70a, and linear side portions 70b perpendicular to the reference edge surface z. This allows the punched hole 70 to be fitted on the pin formed on the plate cylinder if the depth D of the punched hole 70 is varied. Preferably, the side portions 70b of the punched hole 70 are of a linear shape perpendicular to the reference edge surface z. The punched hole 70 may be of a rectangular shape, for example, as shown in FIG. 5B.

The positioning and punching unit 20 places the positioning plate 27 in the suspended position for the positioning of the printing plate P. The positioning and punching unit 20 places the positioning plate 27 in the raised position for the insertion of the reference edge surface z into the insertion opening 36.

Referring again to FIG. 4, the positioning and punching unit 20 has the driver 41. The driver 41 moves the positioning units 22 and the punching units 33 back and forth integrally in the main scanning direction. The driver 41 includes a frame 42, a pair of support members 43, a feed screw 44, a pair of guide shafts 45, a coupling member 46, a support member 47, a movable base 48, and a feed motor M2. The pair of support members 43 are mounted upright on the frame 42. The feed screw 44 is a ball screw, and is rotatably held in a hanging manner by the pair of support members 43 so as to extend in the main scanning direction. The pair of guide shafts 45 are held in a hanging manner by the frame 42 in parallel to the feed screw 44. The coupling member 46 is in engagement with the feed screw 44, with balls therebetween. The support member 47 is attached to the movable base 48, and passes slidably through the coupling member 46 and the guide shafts 45. The feed motor M2 is a pulse motor, and drives the feed screw 44 for rotation. The feed screw 44 and the coupling member 46 constitute a feed mechanism for the movable base 48. The rotation of the feed motor M2 is transmitted to the feed screw 44. The movable base 48 is moved forwardly and backwardly in the main scanning direction by the rotation of the feed screw 44 in the forward and reverse directions.

The mounting base 40 is fixedly mounted to the movable base 48 by a pin 54.

1-2. First Technique in First Preferred Embodiment

Next, techniques for image recording in the image recording apparatus 1 will be described. In an example to be described below, the image recording apparatus 1 records a cyan image Ic, a magenta image Im, a yellow image Iy and a black image Ik individually on four printing plates Pc, Pm, Py and Pk to form a single color image.

Two techniques of image recording will be described in the first preferred embodiment. In a first technique, the positions of the printing plates Pc, Pm, Py and Pk on the table 12 are fixed, whereas the positions of the images Ic, Im, Iy and Ik to be recorded on the respective printing plates Pc, Pm, Py and Pk are shifted gradually. In a second technique, both the positions of the printing plates Pc, Pm, Py and Pk on the table 12 and the positions of the images Ic, Im, Iy and Ik to be recorded are shifted gradually. In either technique, the images Ic, Im, Iy and Ik are recorded in different positions relative to an immobile system including the optical axis of the optical system 52 and the reference position y1.

Figure 6A:
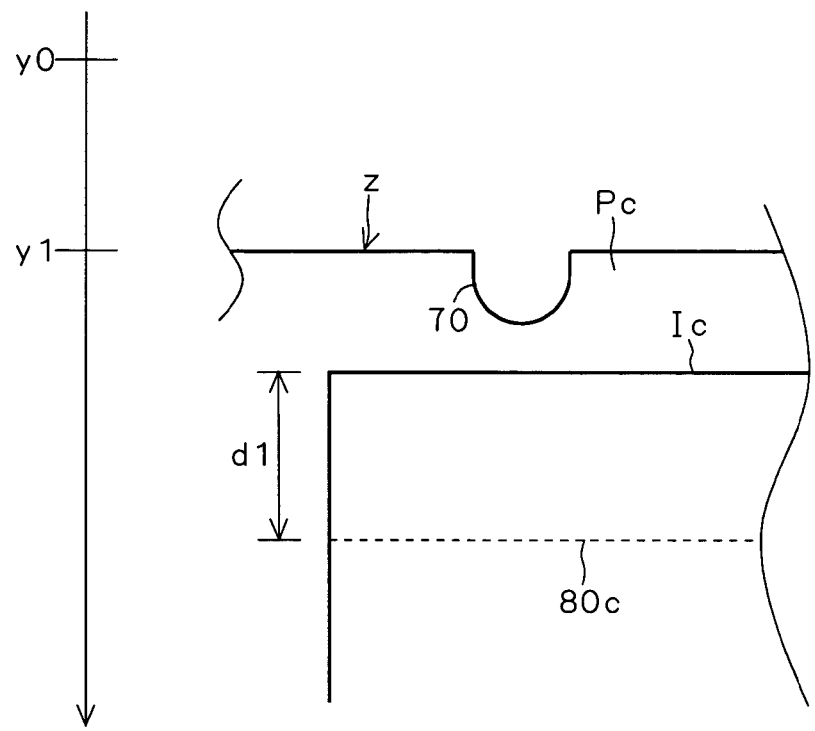
FIGS. 6A and 6B show edge portions of printing plates after recording.
Figure 6B:
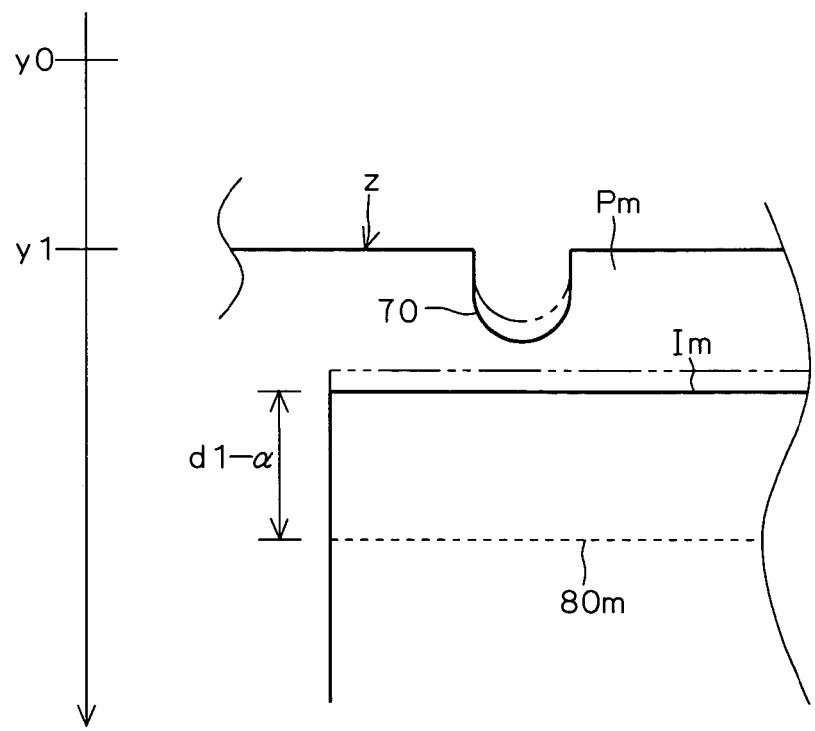

FIGS. 6A and 6B show the reference edge surface z of the printing plate P and its vicinity when the first technique is implemented. FIG. 6A shows that the image Ic is recorded on the printing plate Pc. FIG. 6B shows that the image Im is recorded on the printing plate Pm. A flaw in the optical system 52 gives rise to a streak 80c in the image Ic, and a streak 80m in the image Im.

It is assumed in the first technique that the positions of the printing plates Pc and Pm are fixed in the main scanning direction. That is, the reference edge surface z of each of the printing plates Pc and Pm is in the position y1. A shift is effected to produce a distance α between the recording start positions of the scanning lines L for the printing plate Pc and for the printing plate Pm. Thus, the position of the image Im is shifted the distance α from the position of the image Ic in the main scanning direction.

The difference between the positions of the images Ic and Im is achieved by controlling the time at which the laser diode LD is driven. As illustrated in FIG. 2, the image signal 91 is delayed by the delay amount 96 depending on the color information 95. The laser diode LD is driven by the drive signal 92 obtained based on the image signal 91.

As described above, the image recording apparatus 1 effects the position shift to produce the difference between the recording positions of the images for the printing plates Pc and Pm. However, the positions of the streaks 80c and 80m appearing in the images are not shifted. This is because the streaks 80c and 80m result from a defect in the optical system 52. Thus, the streaks in the images Ic and Im appear in different positions. Specifically, the streak 80c appears in a position spaced a distance d1 apart from an edge of the image Ic on the printing plate Pc, and the streak 80m appears in a position spaced a distance (d1-α) apart from an edge of the image Im on the printing plate Pm.

Similarly, a streak appears in a position spaced a distance (d1-2α) apart from an edge of the image Iy on the printing plate Py, and a steak appears in a position spaced a distance (d1-3α) apart from an edge of the image Ik on the printing plate Pk, although not shown. Thus, the streaks appearing in the respective images do not coincide with each other when the four images Ic, Im, Iy and Ik are superimposed on each other later. This prevents the streaks from being superimposed on each other and thereby being intensified.

The punched holes 70 are used for the overprinting of the images Ic, Im, Iy and Ik. The printing plates Pc, Pm, Py and Pk are mounted on the plate cylinders of a printing machine by the use of the punched holes 70. For the purpose of superimposing the images Ic, Im, Iy and Ik with high precision, the printing plates Pc, Pm, Py and Pk have the same positional relationship between the images and the punched holes.

The image recording apparatus 1 also forms the punched holes 70 in different positions in the main scanning direction in accordance with the positions of the images Ic, Im, Iy and Ik. That is, the punched holes 70 of the printing plates Pc, Pm, Py and Pk are different from each other in depth D. For example, the punched hole 70 of the printing plate Pm is deeper by the distance α in the main scanning direction than the punched hole 70 of the printing plate Pc. Thus, the printing plates Pc, Pm, Py and Pk have the same positional relationship between the images and the tops of the punched holes 70. This allows the images Ic, Im, Iy and Ik to be superimposed on each other with high precision.

Figure 7:
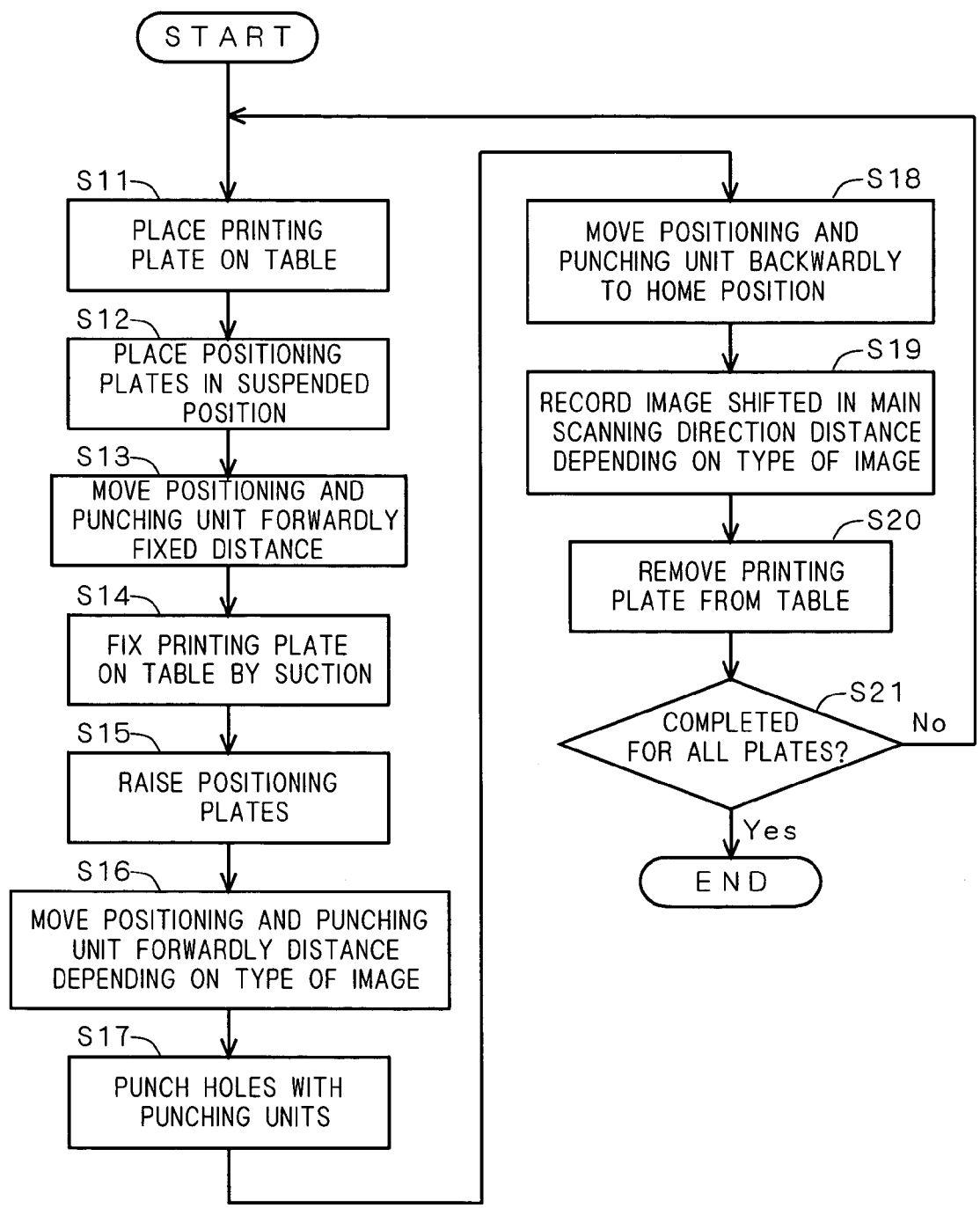
FIG. 7 shows a flow of processes in a first technique according to the first preferred embodiment.

FIG. 7 is a flowchart of the image recording in the first technique. Steps in FIG. 7 will be described below.

First, the printing plate P is placed on the table 12 (in Step S11). The printing plate P may be placed either by using a supply mechanism not shown or manually. The printing plate P is placed on the table 12, with the reference edge surface z protruding from the table 12.

The image recording apparatus 1 places the positioning plates 27 of the positioning units 22 in the suspended position (in Step S12). This makes the positioning plates 27 contactable with the reference edge surface z of the printing plate P.

The image recording apparatus 1 drives the feed screw 44 of the driver 41 to move the positioning and punching unit 20 toward the table 12 (in Step S13). The positioning and punching unit 20 is moved together with the mounting base 40. The distance that the positioning and punching unit 20 moves in Step S13 is fixed independently of the color information. The reference edge surface z of the printing plate P moves to the reference position y1.

The image recording apparatus 1 fixes the printing plate P on the table 12 by vacuum suction through a suction channel (not shown) on the table 12 (in Step S14). This completes the positioning of the printing plate P in the main scanning direction.

The image recording apparatus 1 places the positioning plates 27 in the raised position (in Step S15). This makes the positioning plates 27 non-contactable with the reference edge surface z of the printing plate P, and makes the reference edge surface z of the printing plate P insertable into the insertion opening 36 of each of the punching units 33.

The image recording apparatus 1 moves the positioning and punching unit 20 forwardly in the y direction a distance depending on the color information about the image (in Step S16). The positioning and punching unit 20 is first moved to a predetermined standard position. Thereafter, the positioning and punching unit 20 is additionally moved a distance of zero for cyan, a distance of $\alpha$ for magenta, a distance of $2\alpha$ for yellow, and a distance of $3\alpha$ for black.

The image recording apparatus 1 causes the punching units 33 to punch the holes 70 in the printing plate P (in Step S17). The amount of insertion of the printing plate P into the punching units 33 is different depending on the color information. Therefore, the punched holes 70 are different in depth D depending on the color information.

The image recording apparatus 1 moves the positioning and punching unit 20 backwardly to the home position y0 (in Step S18).

The image recording apparatus 1 causes the main scanning unit 50 to scan the optical beam in the main scanning direction while moving the table 12 in the sub-scanning direction x. Thus, the image recording apparatus 1 records an image I on the printing plate P (in Step S19). The image I is composed of a plurality of scanning lines L. The drawing start position of each of the scanning lines L is shifted in the main scanning direction in accordance with the color information. The distance that the scanning lines L is shifted is zero for cyan, $\alpha$ for magenta, $2\alpha$ for yellow, and $3\alpha$ for black. As described above, the image recording apparatus 1 provides the different time intervals between the detection of the optical beam from the laser diode LD by the start sensor 53 and the start of the supply of the drive signal based on the image signal in accordance with the color information. Thus, the image recording apparatus 1 shifts the drawing start positions of the scanning lines L.

The image recording apparatus 1 removes the printing plate P from the table 12 (in Step S20).

The image recording apparatus 1 judges whether or not all of the cyan, magenta, yellow and black images are recorded (in Step S21). When not all of the images are recorded, the processing returns to Step S11. Then, the image recording apparatus 1 starts the process for the next color.

1-3. Second Technique in First Preferred Embodiment

Next, the second technique will be described. In the second technique, both the position of the printing plate P on the table 12 in the main scanning direction and the recording position of the image I are changed depending on the color information.

FIGS. 8A and 8B show the reference edge surface z of the printing plate P and its vicinity when the second technique is implemented. FIG. 8A shows that the image Ic is recorded on the printing plate Pc. FIG. 8B shows that the image Im is recorded on the printing plate Pm. A flaw in the optical system 52 gives rise to the streak 80c in the image Ic, and the streak 80m in the image Im.

In the second technique, the printing plate Pm is positioned after being shifted the distance $\alpha$ from the printing plate Pc in the main scanning direction. That is, the reference edge surface z of the printing plate Pc is in the position y1, whereas the reference edge surface z of the printing plate Pm is in a position (y1+$\alpha$).

The position of the image Im is also shifted the distance $\alpha$ from the position of the image Ic in the main scanning direction. The difference between the images Ic and Im due to the shifting is achieved by controlling the time at which the laser diode LD is driven.

As described above, the shifts are both effected to produce the difference between the positions of the printing plates Pc and Pm and the difference between the positions of the images Ic and Im. However, the positions of the streaks 80c and 80m are not shifted. This is because the streaks 80c and 80m result from a defect in the optical system 52. Thus, the streaks 80c and 80m in the images. Ic and Im appear in different positions. Specifically, the streak 80c appears in a position spaced the distance d1 apart from an edge of the image Ic on the printing plate Pc, and the streak 80m appears in a position spaced the distance (d1-$\alpha$) apart from an edge of the image Im on the printing plate Pm.

Similarly, a streak appears in a position spaced the distance (d1-$2\alpha$) apart from an edge of the image Iy on the printing plate Py, and a steak appears in a position spaced the distance (d1-$3\alpha$) apart from an edge of the image Ik on the printing plate Pk, although not shown. Thus, the streaks appearing in the respective images do not coincide with each other when the four images Ic, Im, Iy and Ik are superimposed on each other later. This prevents the streaks from being superimposed on each other and thereby being intensified.

In the second technique, the position of the printing plate P and the position of the image I are shifted the same distance depending on the color information. Thus, the position of the image I relative to each printing plate P is fixed. It is therefore unnecessary to change the depth D of the punched holes 70 depending on the color information.

Figure 9:
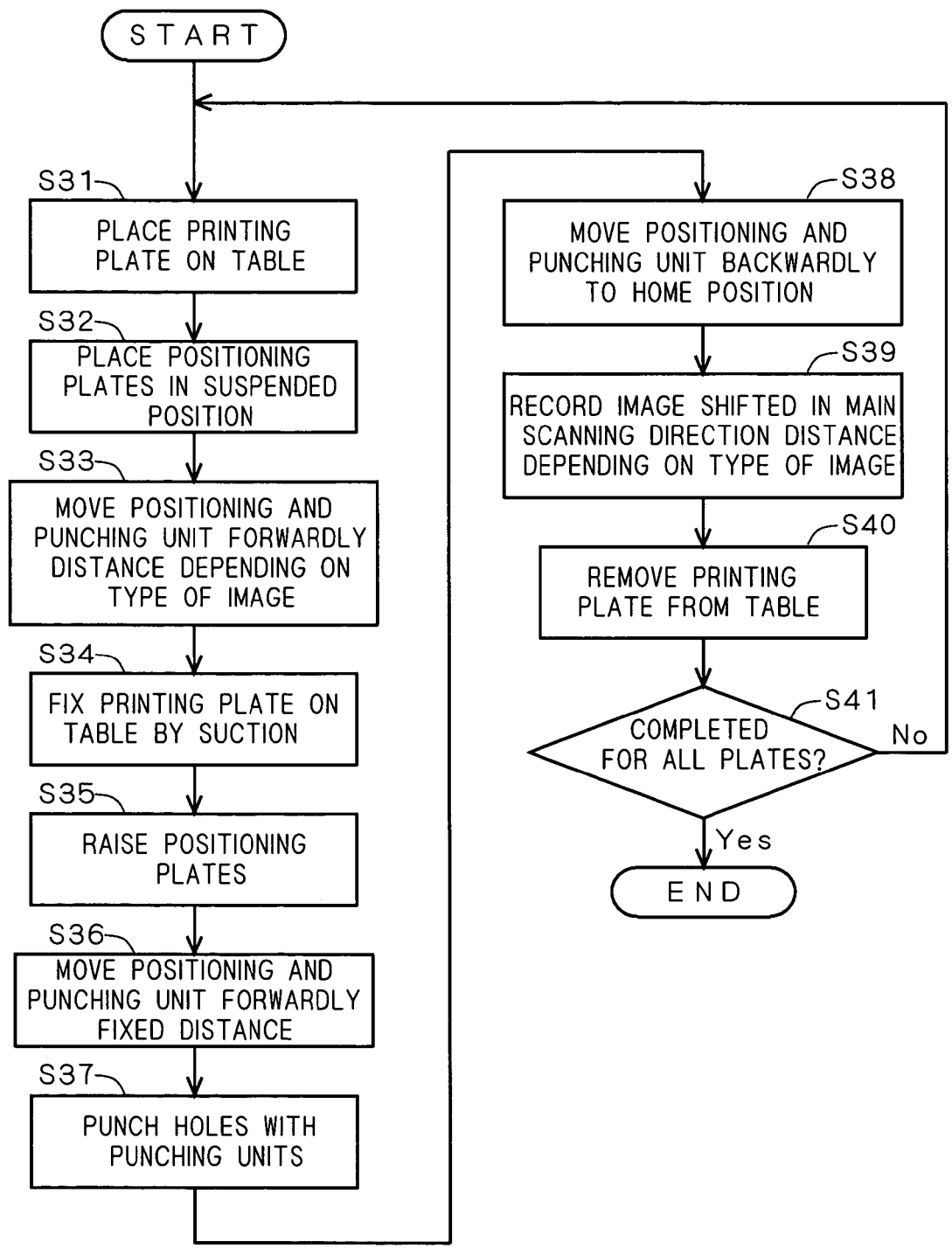
FIG. 9 shows a flow of processes in a second technique according to the first preferred embodiment.

FIG. 9 is a flowchart of the image recording in the second technique. Steps in FIG. 9 will be described below.

First, the printing plate P is placed on the table 12 (in Step S31). The printing plate P may be placed either by using a supply mechanism not shown or manually. The printing plate P is placed on the table 12, with the reference edge surface z protruding from the table 12.

The image recording apparatus 1 places the positioning plates 27 of the positioning units 22 in the suspended position (in Step S32). This makes the positioning plates 27 contactable with the reference edge surface z of the printing plate P.

The image recording apparatus 1 drives the feed screw 44 of the driver 41 to move the positioning and punching unit 20 toward the table 12 (in Step S33). The positioning and punching unit 20 is moved together with the mounting base 40. Because of the movement of the positioning and punching unit 20, the positioning plates 27 press the printing plate P and are positioned in the main scanning direction. The printing plate P is pressed until the reference edge surface z reaches the reference position y1. Thereafter, the printing plate P is additionally pressed to move a distance of zero for cyan, a distance of α for magenta, a distance of 2α for yellow, and a distance of 3α for black. This causes the printing plate Pm to be shifted the distance α from the printing plate Pc in the y direction, as shown in FIG. 8B.

The image recording apparatus 1 fixes the printing plate P on the table 12 by vacuum suction through a suction channel (not shown) on the table 12 (in Step S34). This completes the positioning of the printing plate P in the main scanning direction.

The image recording apparatus 1 places the positioning plates 27 in the raised position (in Step S35). This makes the positioning plates 27 non-contactable with the reference edge surface z of the printing plate P, and makes the reference edge surface z of the printing plate P insertable into the insertion opening 36 of each of the punching units 33.

The image recording apparatus 1 moves the positioning and punching unit 20 a fixed distance (in Step S36). This inserts the reference edge surface z of the printing plate P into the insertion opening 36 of each of the punching units 33.

The image recording apparatus 1 causes the punching units 33 to punch the holes 70 in the printing plate P (in Step S37). The punched holes 70 have the fixed depth D independently of the color information.

The image recording apparatus 1 moves the positioning and punching unit 20 backwardly to the home position y0 (in Step S38).

The image recording apparatus 1 causes the main scanning unit 50 to scan the optical beam in the main scanning direction while moving the table 12 in the sub-scanning direction x. Thus, the image recording apparatus 1 records an image I on the printing plate P (in Step S39). The image I is composed of a plurality of scanning lines L. The drawing start position of each of the scanning lines L is shifted in the main scanning direction in accordance with the color information. The distance that the scanning lines L is shifted is zero for cyan, α for magenta, 2α for yellow, and 3α for black. As described above, the image recording apparatus 1 provides the different time intervals between the detection of the optical beam from the laser diode LD by the start sensor 53 and the start of the supply of the drive signal based on the image signal in accordance with the color information. Thus, the image recording apparatus 1 shifts the drawing start positions of the scanning lines L.

The image recording apparatus 1 removes the printing plate P from the table 12 (in Step S40).

The image recording apparatus 1 judges whether or not all of the cyan, magenta, yellow and black images are recorded (in Step S41). When not all of the images are recorded, the processing returns to Step S31. Then, the image recording apparatus 1 starts the process for the next color.

In the second technique, the position of the image I relative to the reference edge surface z is fixed independently of the color information. This facilitates the operation of positioning the printing plate P in the step of printing.

Figure 10:
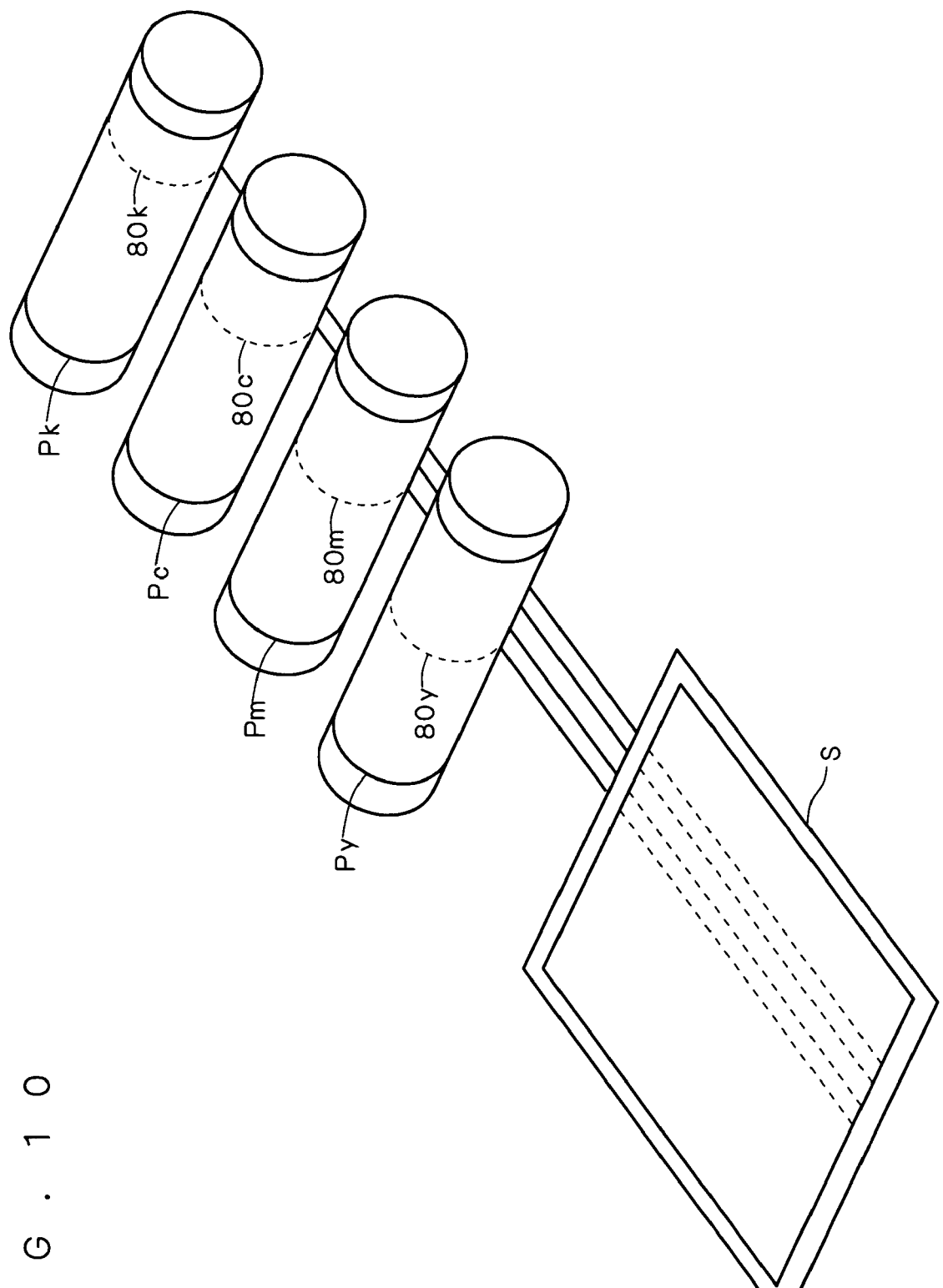
FIG. 10 shows overprinting of a plurality of images.

FIG. 10 shows the overprinting of images using the printing plates Py, Pm, Pc and Pk with the respective images recorded thereon by the second technique. As illustrated in FIG. 10, an objective image is formed by superimposing the image Iy recorded on the printing plate Py, the image Im recorded on the printing plate Pm, the image Ic recorded on the printing plate Pc and the image Ik recorded on the printing plate Pk upon a single sheet S of paper.

The streaks 80y, 80m, 80c and 80k appear on the printing plates Py, Pm, Pc and Pk, respectively, due to a defect in the optical system 52. However, the positions of the streaks 80y, 80m, 80c and 80k are shifted from each other. For this reason, the streaks 80y, 80m, 80c and 80k are transferred to different positions on the sheet S. Therefore, the streaks 80y, 80m, 80c and 80k are prevented from being superimposed on each other and thereby being intensified.

2. Second Preferred Embodiment

2-1. Construction of Apparatus of Second Preferred Embodiment

Figure 11:
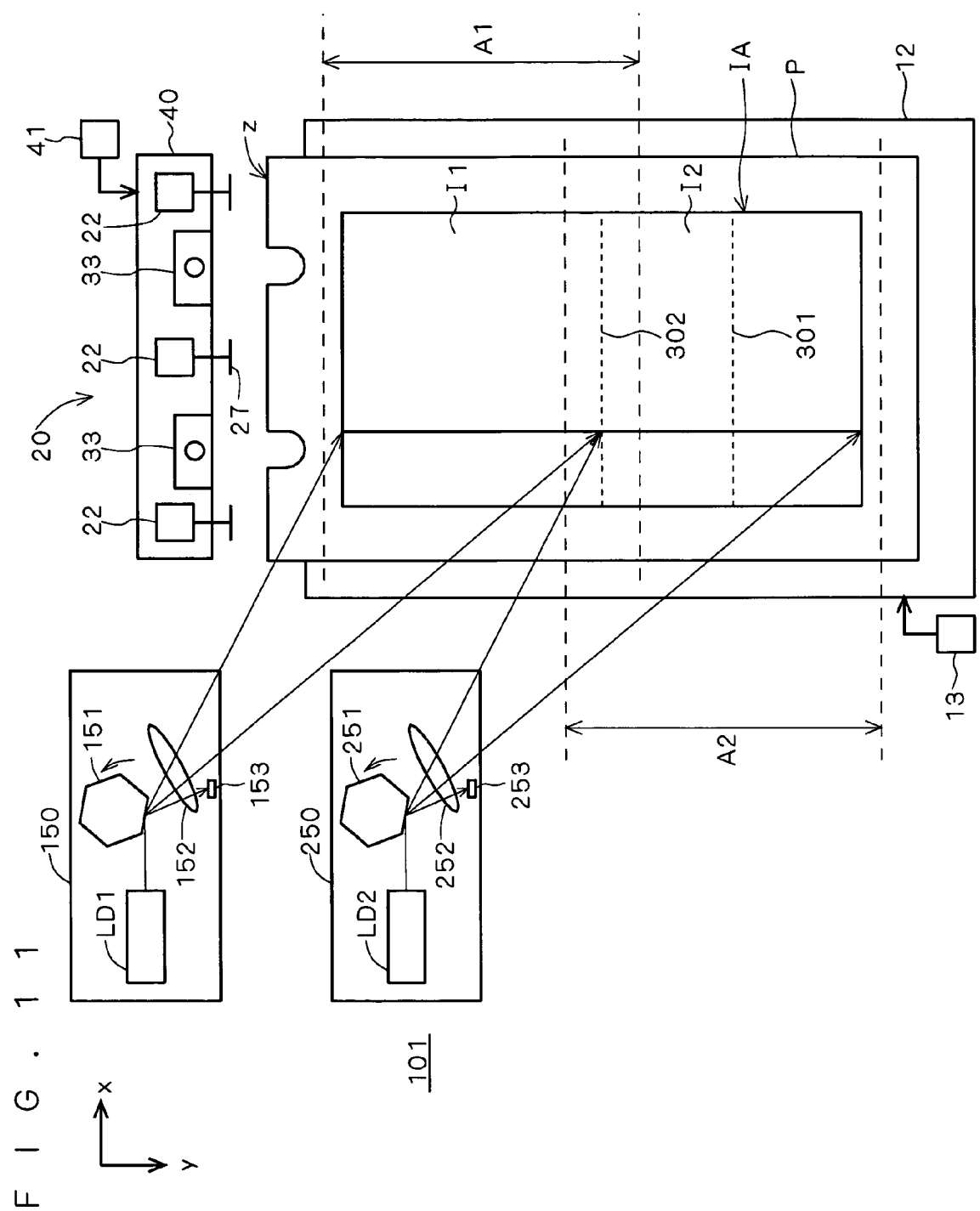
FIG. 11 shows a construction of the image recording apparatus according to a second preferred embodiment of the present invention.

Next, a second preferred embodiment according to the present invention will be described. FIG. 11 shows an image recording apparatus 101 according to the second preferred embodiment.

The image recording apparatus 101 is an apparatus for recording a halftone-dot image IA on the printing plate P by the use of an optical beam. The table 12, the positioning and punching unit 20, the drivers 41 and 13 of the image recording apparatus 101 are similar in construction to those of the above-mentioned image recording apparatus 1, and hence will not be described again.

The image recording apparatus 101 differs from the above-mentioned image recording apparatus 1 in including a pair of main scanning units 150 and 250. The main scanning unit 150 includes a laser diode LD1, a polygon mirror 151, an optical system 152, and a start sensor 153. The main scanning unit 150 is responsible for recording on an image area A1 of the printing plate P. The main scanning unit 250 includes a laser diode LD2, a polygon mirror 251, an optical system 252, and a start sensor 253. The main scanning unit 250 is responsible for recording on an image area A2 of the printing plate P.

The laser diodes LD1 and LD2, the polygon mirrors 151 and 251, the optical systems 152 and 252, and the start sensors 153 and 253 are similar to the laser diode LD, the polygon mirror 51, the optical system 52, and the start sensor 53 of the first preferred embodiment.

The image area A1 and the image area A2 overlap each other. The image recording apparatus 101 arranges a first image I1 recorded by the main scanning unit 150 and a second image I2 recorded by the main scanning unit 250 in adjacent relationship with each other to record the one wholly continuous image IA. In other words, the image recording apparatus 101 can record the image IA wholly greater in size than can the above-mentioned image recording apparatus 1.

Figure 12:
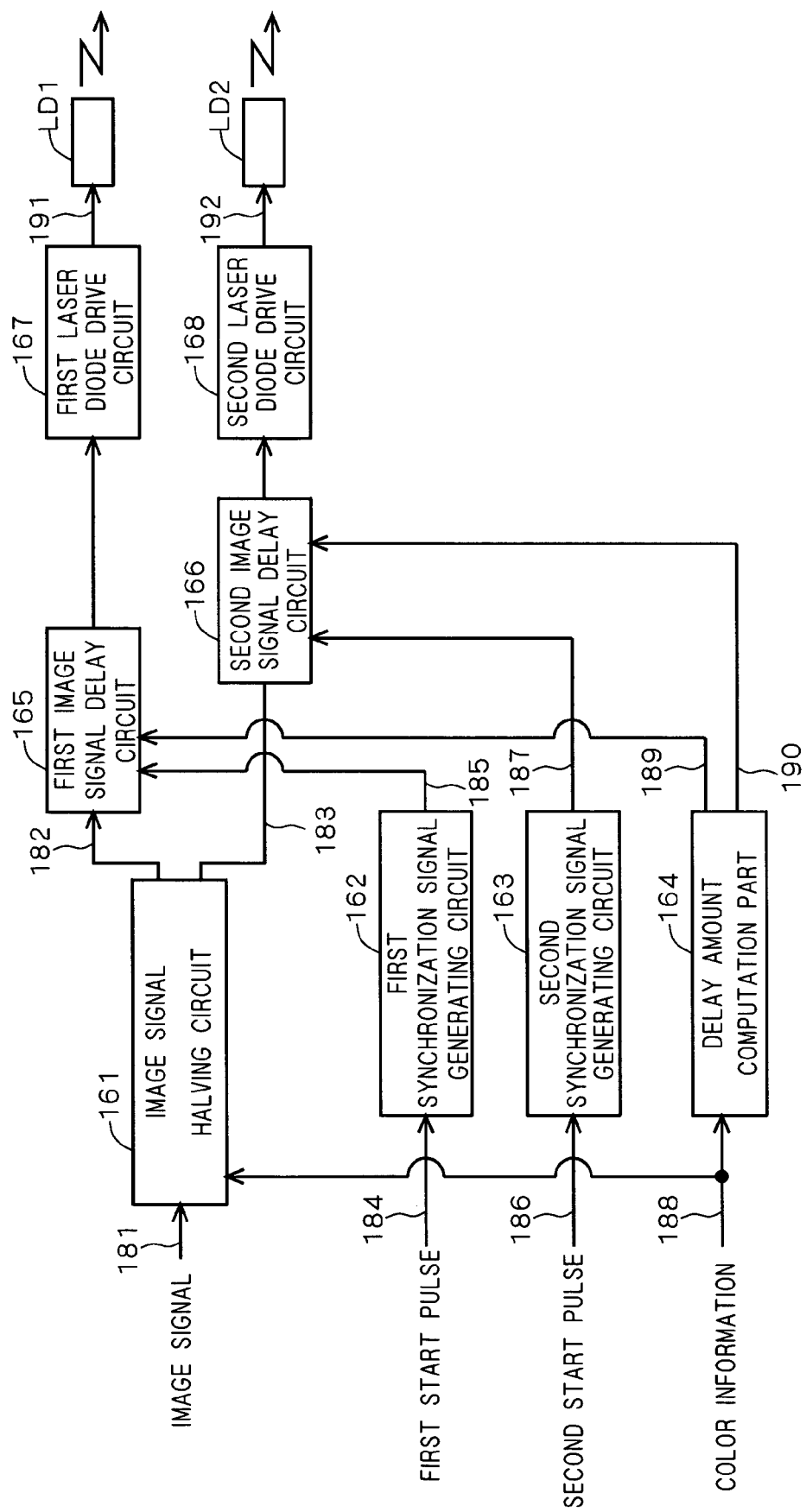
FIG. 12 shows a construction of the drive control system for the laser diode.

FIG. 12 shows the construction of a drive control system for the laser diodes LD1 and LD2. An image signal 181 given to the image recording apparatus 101 is first provided to an image signal halving circuit 161. The image signal halving circuit 161 divides the image signal 181 into upper and lower parts to generate a first image signal 182 and a second image signal 183. The image signal halving circuit 161 changes the position where the image signal 181 is divided, based on color information 188.

A first synchronization signal generating circuit 162 generates a timing signal 185 based on a start pulse 184 received from the start sensor 153. A second synchronization signal generating circuit 163 generates a timing signal 187 based on a start pulse 186 received from the start sensor 253. A delay amount computation part 164 outputs a first delay amount 189 for the first image signal 182 and a second delay amount 190 for the second image signal 183, based on the color information 188.

A first image signal delay circuit 165 receives the first image signal 182 from the image signal halving circuit 161, receives the timing signal 185 from the first synchronization signal generating circuit 162, and receives the first delay amount 189 from the delay amount computation part 164. The first image signal delay circuit 165 delays the first image signal 182 by the first delay amount 189 after the receipt of the timing signal 185, and then provides the first image signal 182 to a first laser diode drive circuit 167.

The first laser diode drive circuit 167 converts the first image signal 182 into a drive signal 191 to provide the drive signal 191 to the laser diode LD1. The laser diode LD1 is controlled to be ON/OFF by the drive signal 191.

A second image signal delay circuit 166, on the other hand, receives the second image signal 183 from the image signal halving circuit 161, receives the timing signal 187 from the second synchronization signal generating circuit 163, and receives the second delay amount 190 from the delay amount computation part 164. The second image signal delay circuit 166 delays the second image signal 183 by the second delay amount 190 after the receipt of the timing signal 187, and then provides the second image signal 183 to a second laser diode drive circuit 168.

The second laser diode drive circuit 168 converts the second image signal 183 into a drive signal 192 to provide the drive signal 192 to the laser diode LD2. The laser diode LD2 is controlled to be ON/OFF by the drive signal 192.

Referring again to FIG. 11, the presence of a defective spot in part of the optical system 152 or 252 of the image recording apparatus 101 causes a lightly colored streak 301 to appear in part of the first image I1 or the second image I2. In some cases, a lightly colored streak 302 also appears in a boundary portion between the first image I1 and the second image I2. The streak 302 appears due to no precise alignment between the joints of the first and second images I1 and I2 in the following cases: (a) there is a difference in density between the first image I1 and the second image I2; (b) there is a misalignment in the main scanning direction between the first image I1 and the second image I2; (c) there is a misalignment in the sub-scanning direction between the first image I1 and the second image I2; (d) the position of an edge of the first image I1 or the second image I2 is displaced because of the aberration of the optical system 152 or 252; (e) there is a difference in beam spot shape between the main scanning units 150 and 250; and (f) there is a difference in the amount of light between the main scanning units 150 and 250.

It is undesirable that these streaks 301 and 302 are intensified by being superimposed on each other during the overprinting of the images. To prevent this, the image recording apparatus 101 records the first image I1 and the second image I2 by a first or second technique of the second preferred embodiment to be described below.

2-2. First Technique in Second Preferred Embodiment

Figure 13A:
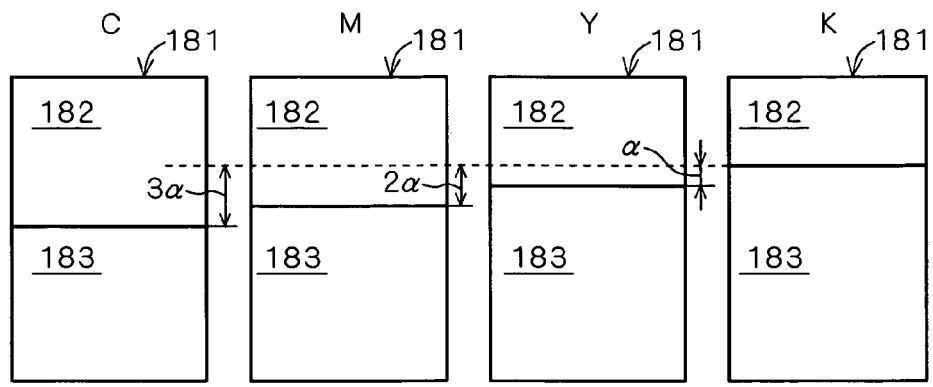
FIG. 13A shows a position where an image signal is divided for each color in a first technique according to the second preferred embodiment.
Figure 13B:
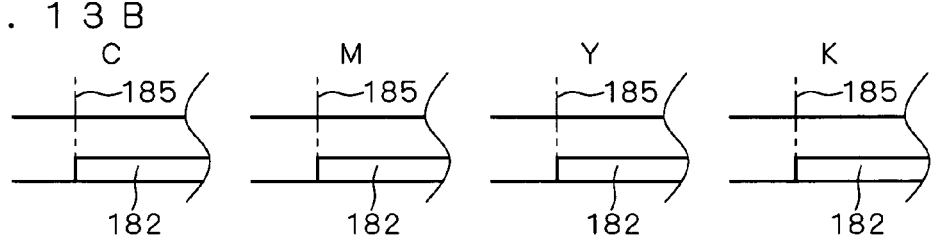
FIG. 13B shows the recording start position of a first image signal for each color in the first technique according to the second preferred embodiment.
Figure 13C:
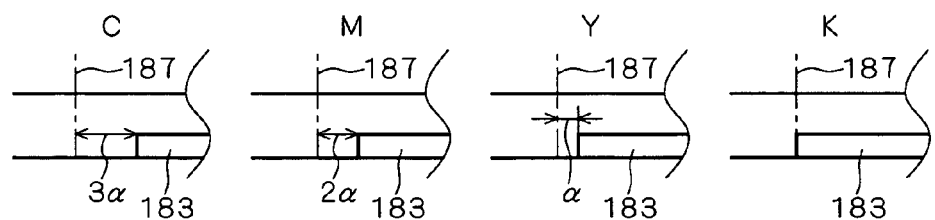
FIG. 13C shows the recording start position of a second image signal for each color in the first technique according to the second preferred embodiment.
Figure 13D:
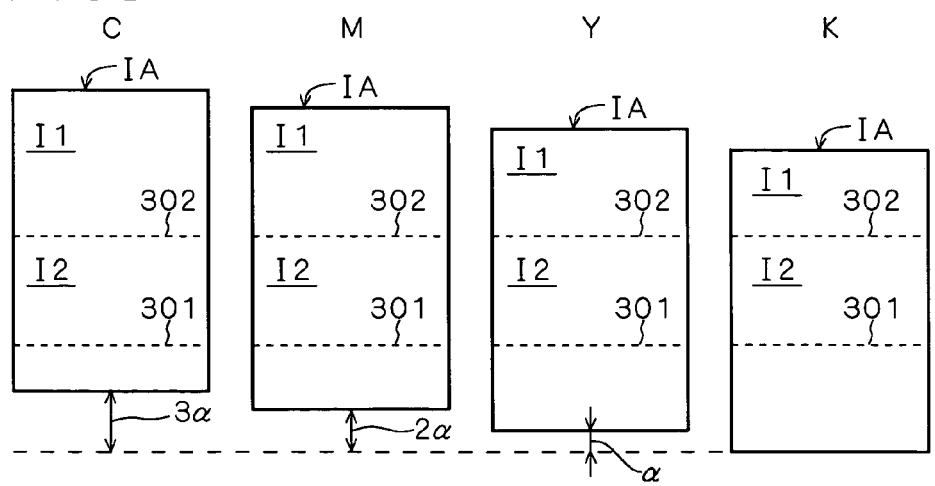
FIG. 13D shows the recording position of an image for each color in the first technique according to the second preferred embodiment.
Figure 13E:
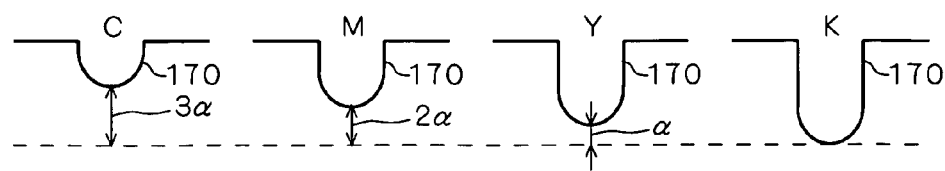
FIG. 13E shows the depth of a punched hole for each color in the first technique according to the second preferred embodiment.

FIG. 13A shows the position where the image signal 181 is divided for each color in the first technique according to the second preferred embodiment. FIG. 13B shows the recording start position of the first image signal 182 for each color in the first technique according to the second preferred embodiment. FIG. 13C shows the recording start position of the second image signal 183 for each color in the first technique according to the second preferred embodiment. FIG. 13D shows the recording position of the image IA for each color in the first technique according to the second preferred embodiment. FIG. 13E shows the depth of a punched hole 170 for each color in the first technique according to the second preferred embodiment.

The first technique makes a change of the distance α to the position where the image signal 181 is divided between cyan, magenta, yellow and black. The first image signals 182 after the division for cyan, magenta, yellow and black are in descending order of dimension, and the second image signals 183 for cyan, magenta, yellow and black are in ascending order of dimension. This is accomplished by the above-mentioned image signal halving circuit 161 changing the position where the image signal 181 is divided based on the color information 188.

The recording start times of the first image signal 182 are the same independently of the colors. That is, the recording start positions of the first image I1 are the same independently of the colors. This is accomplished by the above-mentioned delay amount computation part 164 outputting "0" as the first delay amount 189 independently of the color information 188.

On the other hand, the recording start times of the second image signal 183 are made slightly earlier in the following order: cyan, magenta, yellow and black. This produces a difference of the distance α in the main scanning direction between the recording start positions of the second images I2 for cyan, magenta, yellow and black in the order named. This is accomplished by the above-mentioned delay amount computation part 164 outputting the second delay amount 190 depending on the color information 188.

As a result, the four images IA recorded for cyan, magenta, yellow and black are shifted the distance α from each other in the main scanning direction in the order named. This causes the streaks 301 to appear in different positions relative to the respective images IA. The ratio between the first image I1 and the second image I2 differs between the four images IA. This causes the streaks 302 to appear in different positions relative to the respective images IA. Therefore, neither the streaks 301 nor 302 are superimposed on each other by overprinting. In other words, the streaks 301 and 302 are not intensified in the objective image.

For precise overprinting of the four images IA, the depths of the punched holes 170 for cyan, magenta, yellow and black are increased in increments of the distance α in the order named. Instead of changing the depths of the punched holes 170, the positions of the printing plates P for cyan, magenta, yellow and black during the recording may be shifted the distance α from each other in the order named. The remaining steps in the first technique of the second preferred embodiment are similar to those in the first preferred embodiment.

2-3. Second Technique in Second Preferred Embodiment

Figure 14A:
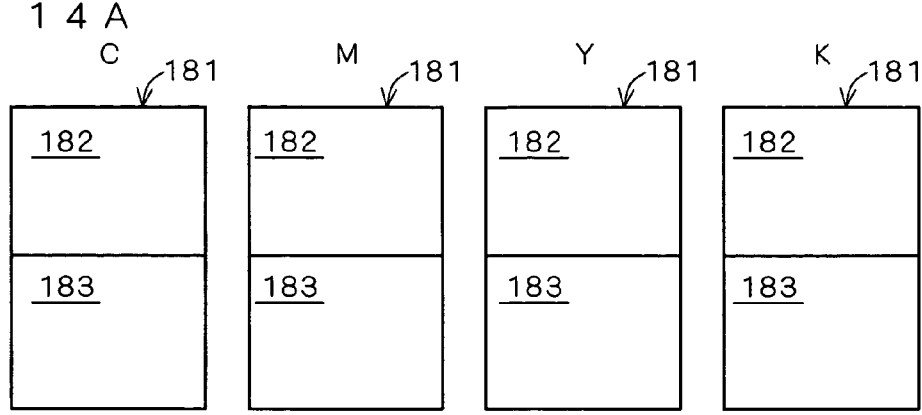
FIG. 14A shows the position where the image signal is divided for each color in a second technique according to the second preferred embodiment.
Figure 14B:
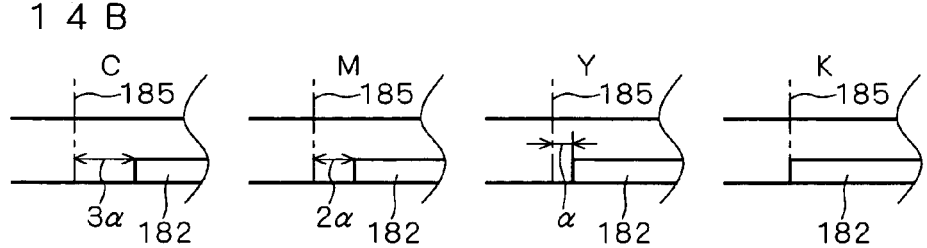
FIG. 14B shows the recording start position of the first image signal for each color in the second technique according to the second preferred embodiment.
Figure 14C:
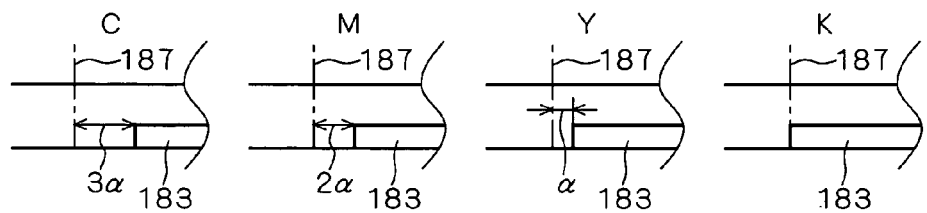
FIG. 14C shows the recording start position of the second image signal for each color in the second technique according to the second preferred embodiment.
Figure 14D:
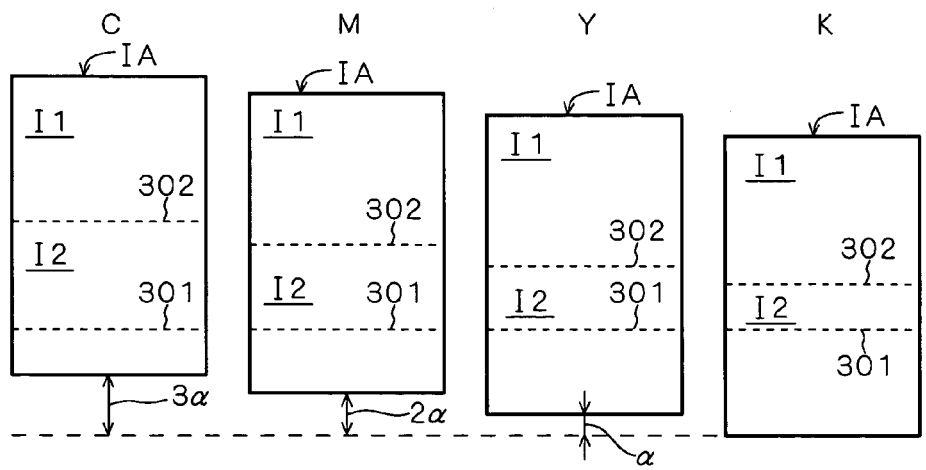
FIG. 14D shows the recording position of the image for each color in the second technique according to the second preferred embodiment.
Figure 14E:
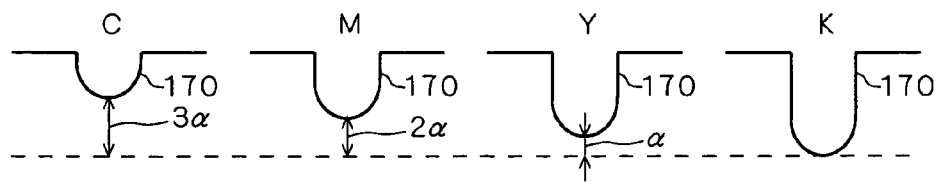
FIG. 14E shows the depth of the punched hole for each color in the second technique according to the second preferred embodiment.
Figure 15:
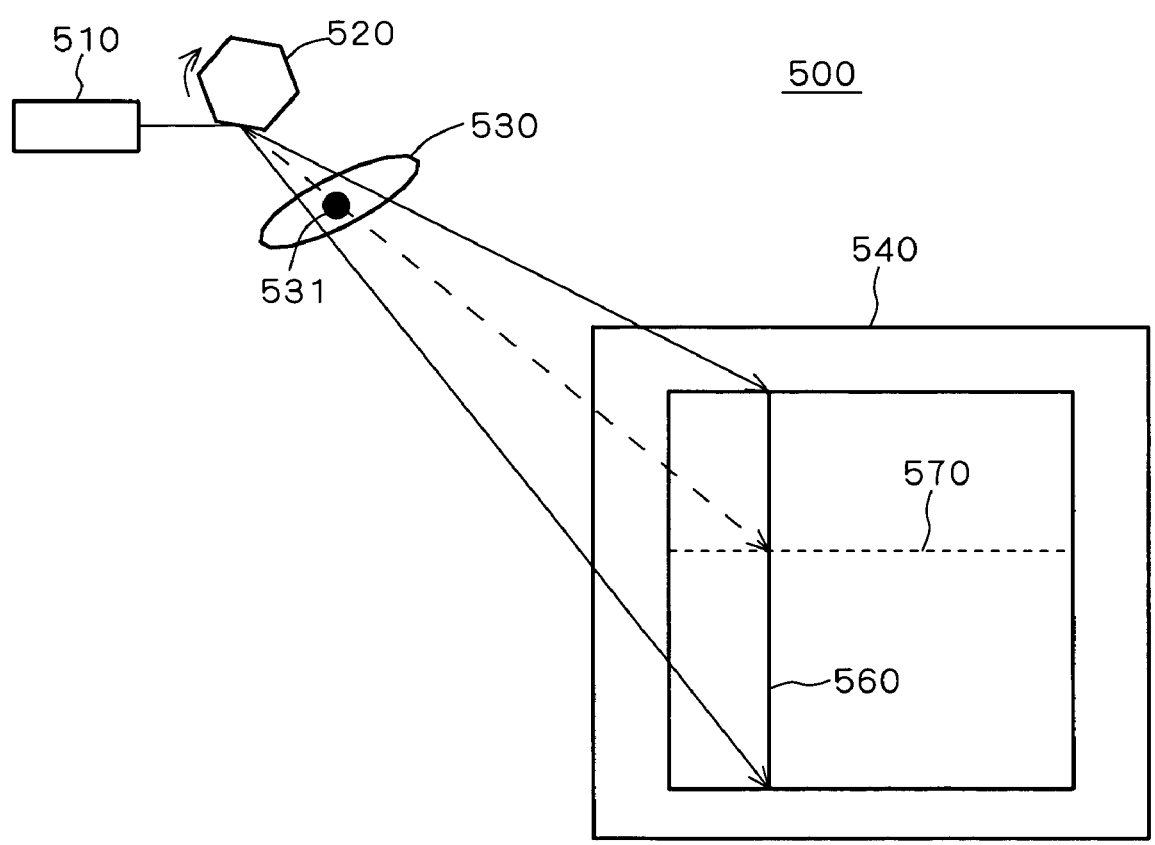
FIG. 15 shows a construction of a conventional image recording apparatus.
Figure 16:
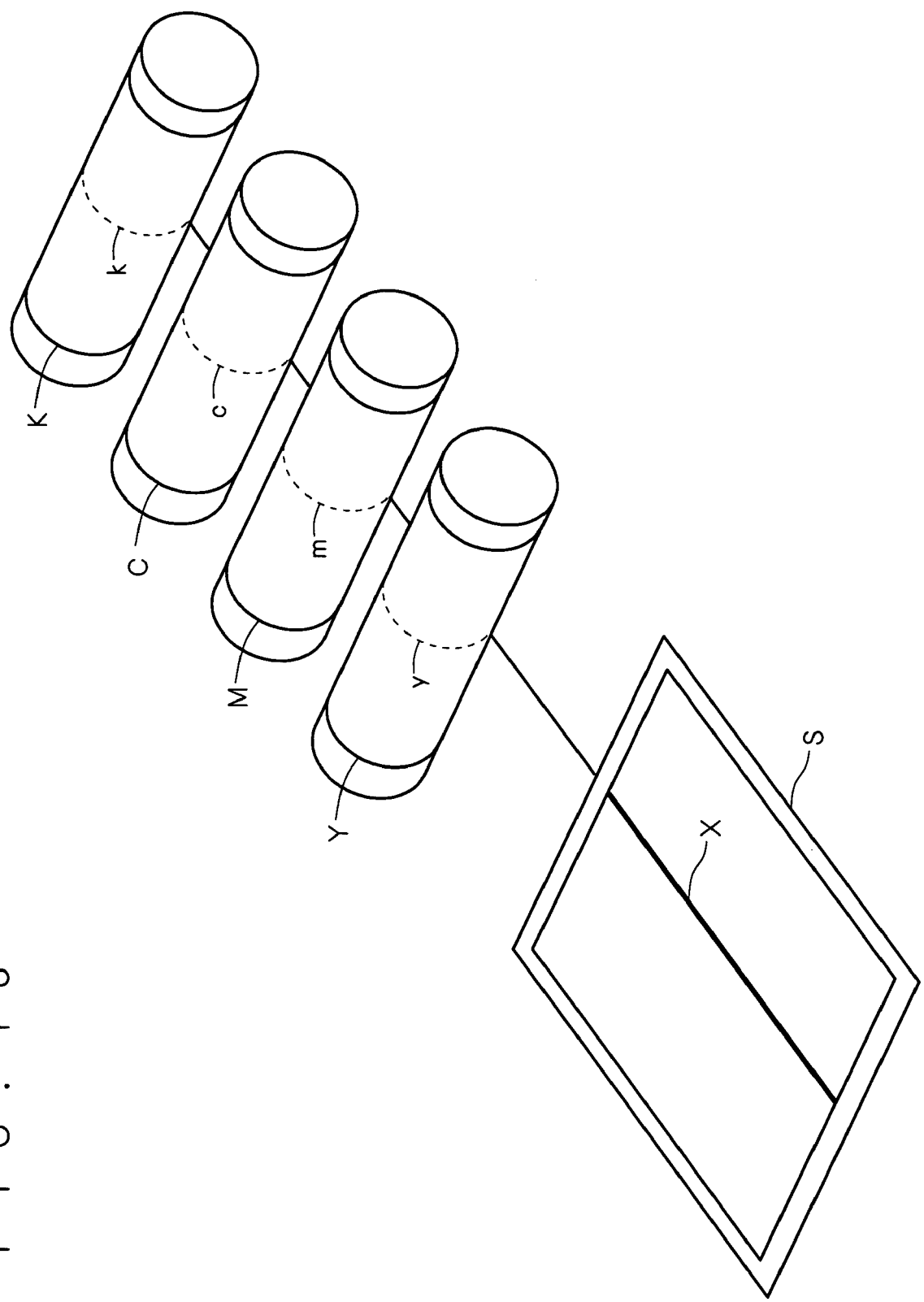
FIG. 16 shows conventional overprinting of a plurality of images.

FIG. 14A shows the position where the image signal 181 is divided for each color in a second technique according to the second preferred embodiment. FIG. 14B shows the recording start position of the first image signal 182 for each color in the second technique according to the second preferred embodiment. FIG. 14C shows the recording start position of the second image signal 183 for each color in the second technique according to the second preferred embodiment. FIG. 14D shows the recording position of the image IA for each color in the second technique according to the second preferred embodiment. FIG. 14E shows the depth of the punched hole 170 for each color in the second technique according to the second preferred embodiment.

In the second technique, the positions where the image signal 181 is divided for cyan, magenta, yellow and black are fixed. In other words, the above-mentioned image signal halving circuit 161 divides the image signal 181 at a fixed ratio independently of the color information 188.

The recording start times of the first image signal 182 are made slightly earlier in the following order: cyan, magenta, yellow and black. This produces a difference of the distance α in the main scanning direction between the recording start positions of the first images I1 for cyan, magenta, yellow and black in the order named. This is accomplished by the above-mentioned delay amount computation part 164 outputting the first delay amount 189 depending on the color information 188.

The recording start times of the second image signal 183 are also made slightly earlier in the following order: cyan, magenta, yellow and black. This produces a difference of the distance α in the main scanning direction between the recording start positions of the second images I2 for cyan, magenta, yellow and black in the order named. This is accomplished by the above-mentioned delay amount computation part 164 outputting the second delay amount 190 depending on the color information 188.

As a result, the four images IA recorded for cyan, magenta, yellow and black are shifted the distance α from each other in the main scanning direction in the order named. This causes the streaks 301 to appear in different positions relative to the respective images IA. Therefore, the streaks 301 are not superimposed on each other by overprinting, and are not intensified in the objective image.

For precise overprinting of the four images IA, the depths of the punched holes 170 for cyan, magenta, yellow and black are increased in increments of the distance α in the order named. Instead of changing the depths of the punched holes 170, the positions of the printing plates P for cyan, magenta, yellow and black during the recording may be shifted the distance α from each other in the order named. The remaining steps in the second technique of the second preferred embodiment are similar to those in the first preferred embodiment.

3. Modifications

It is not necessary to make the recording positions for all of the images different from each other as in the above-mentioned preferred embodiments. Recording at least one of the plurality of images in a different position reduces the superimposition of the streaks on the sheet.

It is not necessary to make the dividing positions for all of the images different from each other as in the above-mentioned preferred embodiments. Dividing at least one of the plurality of images in a different position reduces the superimposition of the streaks on the sheet.

The image recording apparatus according to the present invention may be an apparatus for recording an image on a printing plate P while transporting the printing plate P on a transport mechanism such as a roller. In such an apparatus, the recording positions for the images and the dividing positions for the images may be similarly made different.

The index formed in the printing plate P may include a register mark formed by laser light from the main scanning unit 50. The register mark may be formed by a drawing element (for example, an ink jet) other than the main scanning unit 50.

While the invention has been described in detail, the foregoing description is in all aspects illustrative and not restrictive. It is understood that numerous other modifications and variations can be devised without departing from the scope of the invention.

What is claimed is:

1. An image recording apparatus comprising:
   a scanning part for recording a plurality of unit images individually on a plurality of recording media, said plurality of unit images being to be superimposed on each other to form a single objective image; and
   a holding part for holding said plurality of recording media one by one or together,
   wherein said scanning part includes:
   a scanning unit for scanning said plurality of recording media held by said holding part with a light beam deflected in a main scanning direction; and
   a driving part for moving said plurality of recording media held by said holding part in a sub-scanning direction orthogonal to said main scanning direction, and
   said scanning part causes at least one of said plurality of unit images to differ from another unit image in scanning start position of said scanning unit relative to said reference position of said holding part.

2. The image recording apparatus according to claim 1, wherein said scanning part causes all of said plurality of unit images to differ from each other in scanning start position of said scanning unit relative to said reference position of said holding part.

3. The image recording apparatus according to claim 2, further comprising
   an index forming part for providing an index serving as a reference for superimposition of said plurality of unit images to said plurality of recording media,
   wherein said index forming part causes said plurality of recording media to differ from each other in position of said index in corresponding relation to the positions of said plurality of unit images.

4. The image recording apparatus according to claim 3, wherein said index is a punched hole formed in said plurality of recording media.

5. The image recording apparatus according to claim 2, wherein said holding part is a table for placing said plurality of recording media one by one or together thereon,
   said image recording apparatus further comprising
   a positioning part for positioning said plurality of recording media one by one or together on said table,
   wherein said positioning part causes said plurality of recording media to be in different positions in corresponding relation to the positions of said plurality of unit images.

6. The image recording apparatus according to claim 1, wherein said scanning part causes at least one of said plurality of unit images to differ from another unit image in said scanning start position of said scanning unit relative to said reference position of said holding part by controlling the time at which said scanning unit is driven on the basis of a start pulse indicating the origin of the scanning area.

7. An image recording apparatus comprising:

a scanning part for recording a plurality of unit images individually on a plurality of recording media, said plurality of unit images being to be superimposed on each other to form a single objective image; and a holding part for holding said plurality of recording media one by one or together, wherein said scanning part includes:

a scanning unit for scanning said plurality of recording media held by said holding part with a light beam deflected in a main scanning direction;

an optical system for imaging said light beam on said plurality of recording media; and a driving cart for moving said plurality of recording media held by said holding part in a sub-scanning direction orthogonal to said main scanning direction, and wherein said scanning part causes at least one of said plurality of unit images to differ from another unit image in said scanning start position of said scanning unit relative to said optical system.

8. The image recording apparatus according to claim 7, wherein said scanning part causes all of said plurality of unit images to differ from each other in said scanning start position of said scanning unit relative to said optical system.

9. The image recording apparatus according to claim 8, further comprising an index forming part for providing an index serving as a reference for superimposition of said plurality of unit images to said plurality of recording media, wherein said index forming part causes said plurality of recording media to differ from each other in position of said index in corresponding relation to the positions of said plurality of unit images.

10. The image recording apparatus according to claim 9, wherein said index is a punched hole formed in said plurality of recording media.

11. The image recording apparatus according to claim 8, wherein said holding part is a table for placing said plurality of recording media thereon, said image recording apparatus further comprising a positioning part for positioning said plurality of recording media on said table, wherein said positioning part causes said plurality of recording media to be in different positions in corresponding relation to the positions of said plurality of unit images.

12. The image recording apparatus according to claim 7, wherein said scanning part causes at least one of said plurality of unit images to differ from another unit image in said scanning start position of said scanning unit relative to said optical system by controlling the time at which said scanning unit is driven on the basis of a start pulse indicating the origin of the scanning area.

13. An image recording apparatus for recording a plurality of unit images individually on a plurality of recording media, said plurality of unit images being to be superimposed on each other to form a single objective image, said image recording apparatus comprising:

a dividing part for dividing each of said plurality of unit images into a first image and a second image;

a first scanning part for recording said first image; and a second scanning part for recording said second image, wherein said first scanning part and said second scanning part cause the joining position of the plurality of unit images, for each recording media, to differ from each of the other recording media.

14. The image recording apparatus according to claim 13, wherein said dividing part causes at least one of said plurality of unit images to differ in dividing position.

15. The image recording apparatus according to claim 14, wherein said dividing part causes all of said plurality of unit images to differ from each other in dividing position.

16. A method of recording an image, comprising the steps of:

(a) holding a plurality of recording media one by one; and (b) recording a plurality of unit images individually and sequentially on said plurality of recording media by scanning a light beam deflected in a main scanning direction while moving said plurality of recording media in a sub-scanning direction orthogonal to said main scanning direction, said plurality of unit images being to be superimposed on each other to form a single objective image, wherein at least one of said plurality of unit images on said plurality of recording media is in a different position in said main scanning direction in said step (b).

17. The method according to claim 16, wherein all of said plurality of unit images on said plurality of recording media are in different positions from each other in said step (b).

18. The image recording apparatus according to claim 16, wherein at least one of said plurality of unit images on said plurality of recording media is in a different position in said main scanning direction by controlling the time of scanning a light beam on the basis of a start pulse indicating the origin of the scanning area.

* * * * *